UNITED STATES PATENT OFFICE.

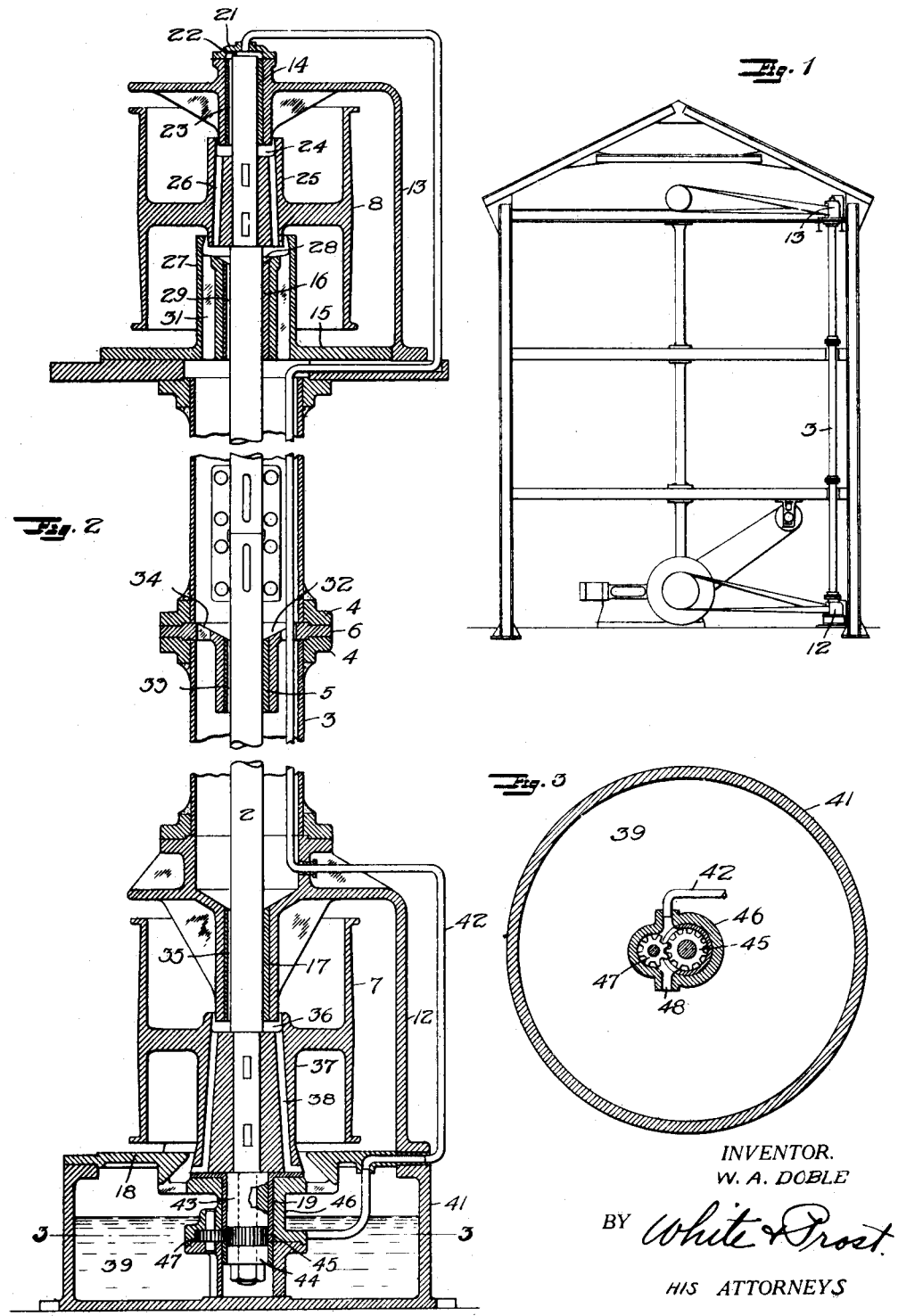

WILLIAM A. DOBLE, OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

SYSTEM OF VERTICAL-TRANSMISSION-SHAFT CONSTRUCTION AND MEANS FOR LUBRICATING THE SAME.

1,383,989.     Specification of Letters Patent.     Patented July 5, 1921.

Application filed January 9, 1917. Serial No. 141,399.

*To all whom it may concern:*

Be it known that I, WILLIAM A. DOBLE, a citizen of the United States, and a resident of the city and county of San Francisco and State of California, have invented a new and useful System of Vertical-Transmission-Shaft Construction and Means for Lubricating the Same, of which the following is a specification.

The invention relates to a system of vertical power transmission shaft construction and to means for lubricating the bearings of the shaft.

An object of the invention is to provide a simple and efficient system of vertical power transmission shaft construction and arrangement.

Another object of the invention is to provide means for lubricating the shaft bearings.

Another object of the invention is to provide means for counter-balancing the weight of the shaft.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a plurality of forms.

Referring to said drawings:

Figure 1 is a vertical section of a factory building, showing the vertical transmission shaft construction.

Fig. 2 is a vertical section of one form of vertical transmission shaft construction of my invention, parts thereof being broken away to reduce the size of the figure.

Fig. 3 is a cross section taken on the line 3—3, Fig. 2.

The invention includes a novel arrangement of the shaft sustaining structure and an arrangement of the guide bearings so that they are self-centered, producing a rigid structure which is always maintained in true alinement. The shaft 2 is inclosed in the housings 3 formed of tubular elements having flanged ends 4 which are accurately finished so that a correct alinement of the column is insured when the elements are bolted together. In many installations, such as in pit pumps, the shaft is very long and it is highly important that the bearings therefor be maintained in true alinement. The shaft bearings 5 which are disposed intermediate the ends of the shaft are each provided with a flange 6, which seats between the flanges 4. The flanges 4 are accurately recessed and the flange 6 is provided on opposite sides with an accurately machined shoulder which engages the recess, thereby insuring true alinement.

The shaft is provided on one end with a pulley or similar means whereby power is transmitted to the shaft and at its other end or at points intermediate its ends with driven means such as pulleys or other mechanisms. In the present instance power is applied to the shaft at its lower end and taken off at the upper end, but any other arrangement may be adopted, according to the circumstances of operation. Secured to the shaft at its lower end is a driven pulley 7 and at the upper end is a driving pulley 8, the pulleys being inclosed in suitable housings 12 and 13, which form continuations of the columnar structure. Formed integral with the housing 13 is the upper shaft bearing 14 and formed in the base plate 15 which is accurately fitted to and attached to the housing 13, is the bearing 16. The housing 12 is similarly provided with a bearing 17 and the base plate 18 is provided with a bearing 19.

Means are provided for efficiently and effectively lubricating the various bearings of the transmission system. The box containing bearing 14 is closed on its upper end by a cap 21, forming above the bearing a chamber 22 into which lubricating oil is introduced. The bearing 14 is provided with a longitudinal groove 23 through which the oil passes into a cup 24 having downwardly diverging sides formed in the hub 25 of the pulley 8. The hub 25 is provided with a plurality of downwardly diverging channels 26, which, when the pulley is rotating, set up a centrifugal action on the oil and force the oil into the receptacle 27 in which the bearing 16 is carried. The bearing 16 and its supporting structure has a dished or depressed upper face 28 into which a portion of the oil falls, lubricating the bearing and passing through a groove 29 therein. The remaining oil is thrown outward and passes down through the channels 31 formed between the bearing and the receptacle 27, into the tube 3.

That portion of the guide bearing flange 6 which lies within the tube is provided with a depressed upper face 32 which collects the oil and directs it to the bearing, which is provided with a longitudinal groove 33. The excess oil passes through the apertures 34 in the flange 6, and down through the tube to the next guide bearing. The lower bearing 17 closes the lower end of the tube and is provided with a depressed upper face for directing the oil to the bearing 17, which is provided with a longitudinal groove 35 through which the oil passes. From the bearing 17, the oil passes into the cup 36, formed in the top of the hub 37 of the pulley 7 and passes thence through the downwardly diverging channels 38 in the hub and is thrown by centrifugal force through the apertures in plate 18 into the chamber 39 formed by the base housing 41.

Novel means are employed for returning the oil from the chamber or sump 39 to the upper end of the shaft, so that a constant circulation of oil through the transmission structure is assured. In many vertical shaft installations, means are provided for balancing the weight of the shaft and this frequently necessitates a slight vertical movement of the shaft, due to the operation of the counter-balancing means and I have constructed the lubricating system to accommodate this movement.

The oil is pumped from the sump into the chamber 22 through the pipe 42, which passes within the tube 3, by a gear pump of novel construction. Secured to the shaft 2 and journaled in bearing 19 is a driven gear formed in three sections, the upper and lower sections 43 and 44 being smooth surfaced and forming close-working fits in the bearing 19. The central section 45 is toothed, the toothed or gear section being of the same diameter as the cylindrical sections 43 and 44. Rotatably mounted in the support 46 for the bearing 19 is the driven gear 47 of the gear pump, which is in mesh with gear 45. The gear 47 is of less width than gear 45, so that the gear 45 may move vertically a limited distance while in mesh with gear 47 and act efficiently as a pump during the vertical movement of the shaft. The chambers in which the gears rotate are connected with the sump 39 through the passage 48. The two smooth cylindrical sections 43 and 44 prevent any material leakage of the gear pump and the wider gear 45 permits a vertical movement of the shaft while maintaining the pump in operation. In this construction the bearing 19 and bearing support 46 form the pump body and the driving gear 45 is free to move axially with relation to the pump body.

During the operation of the gear pump, a certain amount of oil under pressure is forced past the section 44 into the closed chamber thereunder and this oil produces an end thrust on the shaft and assists in counter-balancing the weight thereof. A certain amount of oil is also forced past the cylindrical section 43 and against the under side of the thrust collar formed by the hub of pulley 7, thereby lubricating the thrust bearing causing the shaft to virtually float on oil.

Besides presenting an advantageous shaft mounting and complete lubrication for all bearings of the structure, the columnar structure is of advantage since it incloses all moving parts and thereby removes all danger to operators in its vicinity. Further, since the oil is used over and over again, it may be used in quantity, thereby insuring perfect lubrication.

I claim:

1. In vertical transmission shaft construction, a transmission shaft, a tubular housing surrounding and inclosing the shaft, guide bearings for said shaft carried by said housing and means operated by said shaft for introducing lubricating oil into the tubular housing above the upper guide bearing.

2. In vertical transmission shaft construction, a transmission shaft, a series of flanged tubular elements secured together and surrounding and inclosing the shaft and a guide bearing for the shaft having a flange disposed between the flanges on adjacent tubular elements.

3. In vertical transmission shaft construction, a transmission shaft, a tubular housing surrounding and inclosing the shaft, guide bearings for the shaft arranged within said housing, a lubricating oil chamber disposed adjacent the bottom of the shaft and means operated by said shaft for conveying the oil from said chamber into the upper portion of the tubular housing.

4. In vertical transmission shaft construction, a transmission shaft, a housing surrounding and inclosing the shaft, guide bearings for the shaft arranged within said housing, a lubricating oil chamber arranged adjacent the bottom of the shaft and in communication with said housing, a pump driven by the shaft and drawing oil from said chamber and a conduit connecting the pump with the upper end of the housing.

5. In vertical transmission shaft construction, a transmission shaft, a tubular housing surrounding and inclosing said shaft, guide bearings for said shaft arranged within and supported by said housing and means operated by said shaft for recirculating lubricating oil through said tubular housing.

6. In vertical transmission shaft construction, a transmission shaft, a tubular housing surrounding and inclosing said shaft, guide bearings for said shaft having passages therethrough for lubricating oil, a chamber adjacent the bottom of the shaft in which the lubricating oil is collected, and means operated by said shaft for pumping the oil from said chamber into the upper end of said tubular housing.

7. In vertical transmission shaft construction, a transmission shaft, a housing surrounding and inclosing the shaft, guide bearings for said shaft arranged within said housing and spaced therefrom to permit the passage of lubricating oil down through the housing, an oil collection chamber arranged at the lower end of the housing, a pump connected to the shaft and arranged in said chamber and a conduit connecting the pump with the housing above the upper bearing.

8. In vertical transmission shaft construction, a vertically movable transmission shaft, a housing surrounding and inclosing the shaft, a guide bearing in said housing, said bearings having a groove for the passage of lubricating oil, a chamber arranged below said bearing for receiving said oil, a gear secured to said shaft, a gear meshing with said gear, a casing inclosing said gears and having an inlet passage in communication with said chamber and an outlet passage in communication with the housing above said bearing.

9. In vertical transmission shaft construction, a transmission shaft, a series of flanged tubes inclosing said shaft, and a guide bearing for the shaft having a flange interposed between adjacent faces of said tube flanges, said bearing flange and said tube flanges being provided with means for axially alining said tubes with each other and with said guide bearings.

10. In vertical transmission shaft construction, a vertically movable transmission shaft, a housing inclosing the shaft, a guide bearing for the shaft arranged within said housing, and having means therein for the passage of lubricating oil, an oil collecting chamber at the lower end of the housing, a gear secured to said shaft, a gear of less width than said shaft gear and in mesh therewith, a casing inclosing the gears and having an inlet passage in communication with said oil collecting chamber and an outlet passage discharging upon said guide bearing.

11. In vertical transmission shaft construction, a transmission shaft, a flange arranged adjacent the lower end of said shaft, a bearing in and upon which the end of the shaft and the flange is journaled and rests respectively, said journal bearing being formed with a closed chamber below the end of said shaft, a gear secured to said shaft within said journal bearing, a second gear in mesh with said shaft gear, a collar interposed between said shaft gear and said closed chamber, a collar interposed between said shaft gear and said shaft flange, said collars permitting a leakage of lubricating oil under pressure from said gears to said closed chamber and said flange respectively, and means for supplying lubricating oil to said gears.

In testimony whereof, I have hereunto set my hand at San Francisco, California, this 30th day of December, 1916.

WILLIAM A. DOBLE.

In presence of—
H. G. Prost.